(12) United States Patent
Dalmia (10) Patent No.: US 11,076,301 B1
(45) Date of Patent: Jul. 27, 2021

(54) MULTI-MODE NETWORK ACCESS DEVICE

(71) Applicant: Aquantia Corporation, Milpitas, CA (US)

(72) Inventor: Kamal Dalmia, Fremont, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 140 days.

(21) Appl. No.: 14/180,082

(22) Filed: Feb. 13, 2014

(51) Int. Cl.
*H04W 16/26* (2009.01)

(52) U.S. Cl.
CPC .................................. *H04W 16/26* (2013.01)

(58) Field of Classification Search
CPC ........ H04J 2011/00996; H04B 7/2662; H04W 56/0045; H04W 56/00; H04W 16/26
See application file for complete search history.

(56) References Cited

U.S. PATENT DOCUMENTS

| | | | |
|---|---|---|---|
| 4,464,658 A * | 8/1984 | Thelen ................... | H04L 12/413 340/2.9 |
| 4,658,396 A * | 4/1987 | Barden ............. | H04L 12/40182 370/221 |
| 5,610,903 A * | 3/1997 | Crayford ........... | H04L 12/40136 370/213 |
| 5,940,400 A * | 8/1999 | Eastmond ......... | H04L 12/40032 370/338 |
| 7,412,338 B2 * | 8/2008 | Wynans ................. | G01D 4/006 324/113 |
| 7,990,904 B2 * | 8/2011 | Proctor, Jr. ............ | H04B 7/026 370/315 |
| 8,018,892 B1 * | 9/2011 | Chen ........................ | G06F 9/455 370/310 |
| 8,054,778 B2 * | 11/2011 | Polson .................. | H04W 28/24 370/328 |
| 8,649,386 B2 * | 2/2014 | Ansari ................ | H04L 12/2836 370/401 |
| 8,659,986 B1 | 2/2014 | Martinson et al. | |
| 8,681,116 B2 * | 3/2014 | Merritt ................. | A61B 5/7445 345/173 |
| 9,092,223 B1 * | 7/2015 | Pani ....................... | G06F 1/3209 |
| 9,344,771 B2 * | 5/2016 | Schroeder ............ | H04N 21/436 |
| 9,588,506 B1 * | 3/2017 | Clayton ................. | G05B 15/02 |
| 2002/0120739 A1 * | 8/2002 | McCormack ..... | H04M 3/42314 709/225 |
| 2005/0168326 A1 * | 8/2005 | White, II .................. | H04B 3/56 370/475 |
| 2005/0169056 A1 * | 8/2005 | Berkman .................. | H04B 3/58 365/185.22 |
| 2005/0198233 A1 * | 9/2005 | Manchester ........ | H04L 41/0213 709/221 |
| 2005/0206530 A1 * | 9/2005 | Cumming .............. | G01D 4/006 340/870.02 |
| 2005/0260996 A1 * | 11/2005 | van de Groenendaal ................... | H04L 63/102 455/445 |

(Continued)

*Primary Examiner* — Hassan A Phillips
*Assistant Examiner* — Prenell Jones (57) ABSTRACT

An Ethernet network access device includes a wired Ethernet network port and a wireless network module. The wired Ethernet network port facilitates a wired network connection to a network via a wired network line. The wireless network module includes a wireless transceiver to selectively establish a wireless connection to the network, and a wireless network repeater to selectively provide wireless access to the network for other devices when the wired network connection is established.

13 Claims, 5 Drawing Sheets

(56) References Cited

U.S. PATENT DOCUMENTS

| | | | | |
|---|---|---|---|---|
| 2005/0286466 A1* | 12/2005 | Tagg | H04L 12/2856 | 370/329 |
| 2006/0056370 A1* | 3/2006 | Hancock | H04B 7/2606 | 370/338 |
| 2006/0071776 A1* | 4/2006 | White, II | H02J 13/00034 | 340/538 |
| 2007/0002771 A1* | 1/2007 | Berkman | H04B 3/542 | 370/257 |
| 2007/0025349 A1* | 2/2007 | Bajic | H04L 49/70 | 370/389 |
| 2007/0026799 A1* | 2/2007 | Wang | H04W 88/00 | 455/41.2 |
| 2007/0104169 A1* | 5/2007 | Polson | H04W 28/24 | 370/338 |
| 2007/0173287 A1* | 7/2007 | Henson | H04M 1/677 | 455/557 |
| 2008/0100145 A1* | 5/2008 | Ito | H02J 3/38 | 307/125 |
| 2009/0013210 A1* | 1/2009 | McIntosh | H04L 41/0672 | 714/4.1 |
| 2009/0067441 A1* | 3/2009 | Ansari | H04L 12/2818 | 370/401 |
| 2009/0131020 A1* | 5/2009 | van de Groenendaal | H04L 63/102 | 455/411 |
| 2009/0164668 A1* | 6/2009 | Duckett | H04L 12/5692 | 710/9 |
| 2009/0243836 A1* | 10/2009 | McSheffrey | A61N 1/39 | 340/524 |
| 2009/0252208 A1* | 10/2009 | Frye, Jr. | H04B 3/54 | 375/222 |
| 2010/0020741 A1* | 1/2010 | Hahn | H04B 7/2606 | 370/315 |
| 2010/0045447 A1* | 2/2010 | Mollenkopf | H04B 3/54 | 340/538 |
| 2010/0120361 A1* | 5/2010 | Rappaport | 455/18 | |
| 2010/0271983 A1* | 10/2010 | Bryant | H04B 1/385 | 370/277 |
| 2011/0156636 A1* | 6/2011 | Kim | H02J 7/0055 | 320/108 |
| 2011/0285765 A1* | 11/2011 | Lamontagne | B41J 3/36 | 347/3 |
| 2012/0079567 A1* | 3/2012 | van de Groenendaal | H04L 63/102 | 726/4 |
| 2012/0117099 A1* | 5/2012 | Gross | G06F 19/322 | 707/758 |
| 2012/0210316 A1* | 8/2012 | Rogers | H04L 63/0272 | 717/173 |
| 2013/0286942 A1* | 10/2013 | Bonar | H04L 45/24 | 370/328 |
| 2013/0315132 A1* | 11/2013 | Hou | H04W 88/10 | 370/315 |
| 2014/0003338 A1* | 1/2014 | Rahul | H04B 7/024 | 370/328 |
| 2014/0181883 A1* | 6/2014 | Schroeder | H04N 21/436 | 725/116 |
| 2015/0071164 A1* | 3/2015 | Rappaport | H04B 1/719 | 370/315 |
| 2017/0205812 A1* | 7/2017 | Clayton | G05B 19/41855 | |
| 2017/0208630 A1* | 7/2017 | Liu | H04W 76/14 | |
| 2017/0288727 A1* | 10/2017 | Rappaport | H04B 7/15528 | |
| 2018/0092313 A1* | 4/2018 | Avrahamy | A01G 7/045 | |
| 2019/0050175 A1* | 2/2019 | Moriya | H04W 72/0453 | |
| 2021/0007176 A1* | 1/2021 | Liu | H04W 76/10 | |

\* cited by examiner

FIG. 5

MULTI-MODE NETWORK ACCESS DEVICE

TECHNICAL FIELD

The disclosure herein relates to network devices, and more specifically to network devices and associated methods of accessing an area network via multiple possible modes.

BACKGROUND

Providing access to a network, such as a local area network (LAN) can often be handled in a variety of ways. Wired access, such as through wired Ethernet, typically involves running cables from a network switch, to a variety of locations throughout an area of interest, such as a house, or a place of business. Providing a connection to one of the cables thus provides wired access to the network.

Wireless access to a network is an alternative to wired network access. Locating wireless routers throughout an area of interest can allow users who, for example, have WiFi connectivity, to wirelessly connect to the network. Compared to wired access, however, wireless methods often have reduced throughput, and uncertain range. Newer wireless standards provide higher throughput, but often at a cost of reduced range. Thus, even where wireless access points (APs) are provided throughout a given area, dead zones that have little-to-no reception may exist.

Figure 1:
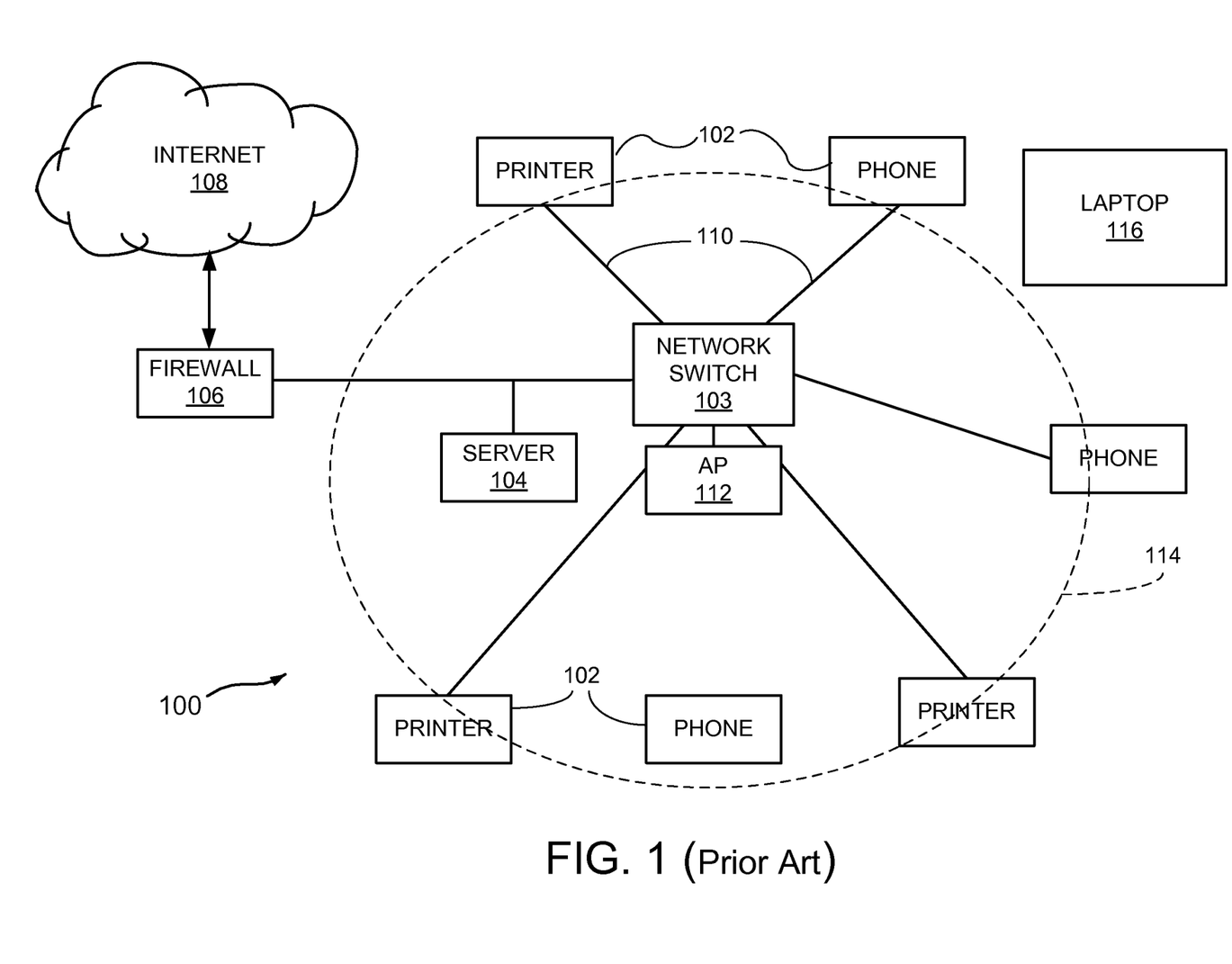
FIG. 1 illustrates a conventional local area network in a given area of interest.

FIG. 1 illustrates a conventional local area network (LAN) 100 that provides network access to plural network devices 102 that are in the form of network telephones, printers and the like. A network switch 103 interfaces the network devices with a server 104 and a firewall 106. The firewall provides a security barrier between the network and outside network resources, such as the Internet 108. Various ones of the network devices 102 are coupled to the network switch via wired connections 110, such as Ethernet cables. Some of the devices access the network via a wireless router or access point AP 112. The access point has an operable range boundary shown by a dotted line at 114. While most of the network devices are within range of the AP 112, a laptop 116 is positioned in a "dead zone" that is outside the range, and thus needs a spare Ethernet cable to access the network, or needs to be repositioned within the range boundary.

Thus, what is needed is an apparatus and method that provides multiple modes of accessing a network, while enhancing the robustness and availability of the network throughout a given area of interest.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of area network devices, methods and networks are disclosed. For one embodiment, a network access device includes a wired network port and a wireless network module. The wired network port facilitates a wired network connection to a network via a wired network line. The wireless network module includes a wireless transceiver to selectively establish a wireless connection to the network, and a wireless network repeater to selectively provide wireless access to the network for other devices when the wired network connection is established.

In a further embodiment, an area network is disclosed that includes plural network access devices distributed throughout an area. Each of the plural network access devices has a wired network port, a wireless network port, and a wireless repeater. The wireless repeater selectively provides wireless network access for a different device based on whether the wired network port is enabled.

In yet another embodiment, a method of accessing a network is disclosed. The method includes providing a network device having a wired network port, and a wireless module having a wireless transceiver and a wireless network repeater. The network device is configured to access the network by one of at least two modes. For a first mode, the wired network port and wireless repeater are enabled, with the wireless transceiver being disabled. For a second mode, the wired network port is disabled and the wireless transceiver enabled.

Figure 2:
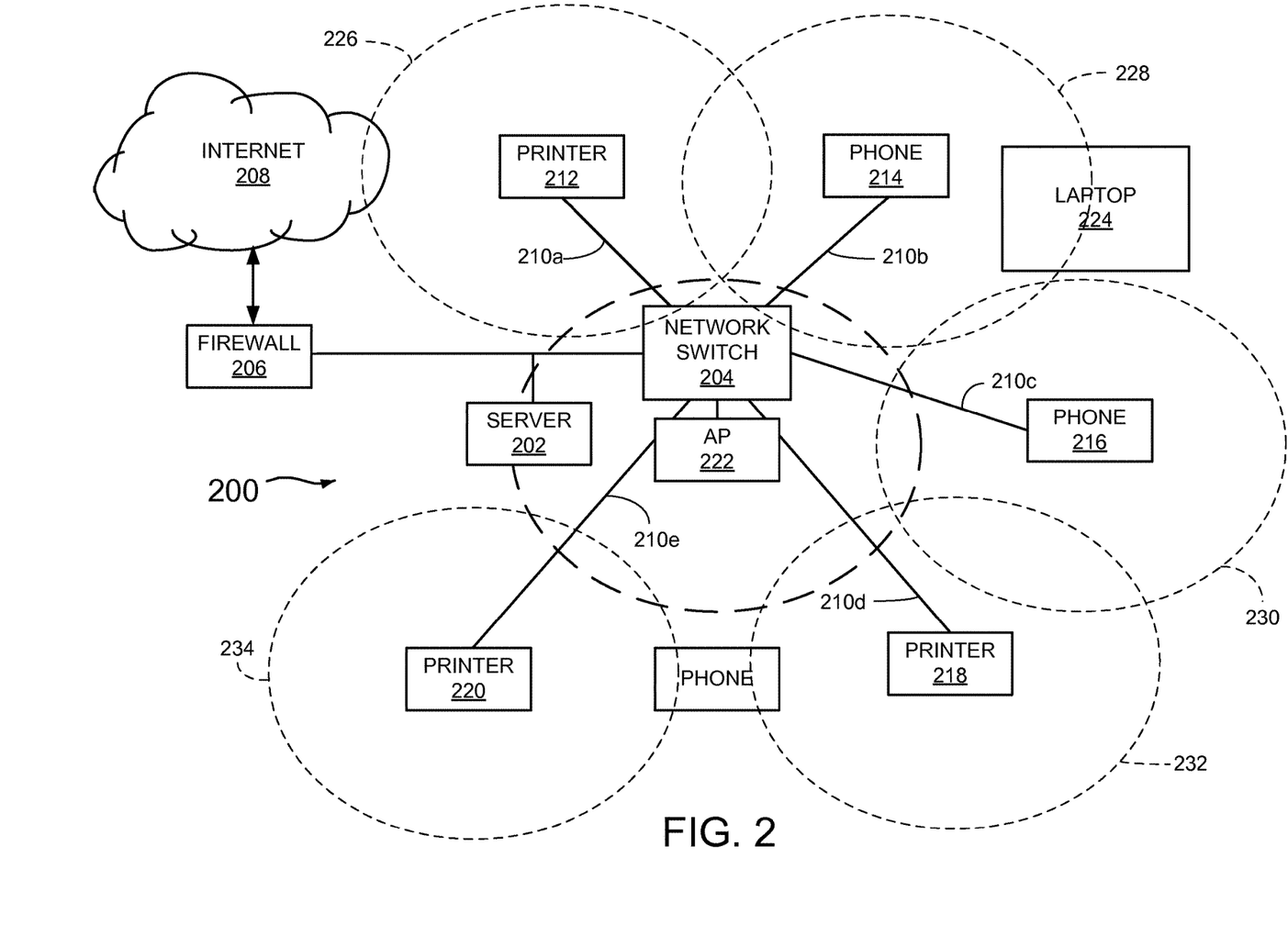
FIG. 2 illustrates one embodiment of a network that employs network devices that are distributed throughout the given area to enhance the robustness and coverage of the network.

Referring now to FIG. 2, a network architecture in accordance with one embodiment, generally designated 200, includes a network server 202 that interfaces with a network switch 204. A firewall 206 is disposed between the network switch 204 and a primary connection 207 to one or more external networks, such as the Internet 208. The network switch 204 includes plural wired connections 210a-210e that interface the server/Internet with a variety of network access devices 212, 214, 216, 218 and 220. For one embodiment, the wired connections are wired Ethernet links, such as 10GBASE-T links. The wired connections are distributed throughout a given area to, as more fully described below, provide enhanced range for wireless access to the network.

With continued reference to FIG. 2, to provide wireless connectivity to the network, a wireless router, or dedicated access point (AP) 222, is coupled to the network switch. The dedicated access point 222 establishes a wireless connection, such as through WiFi or Bluetooth standard protocols, to paired network devices. The AP has a given range specified by the dotted oval at 222. The AP may support WiFi and/or Bluetooth wireless protocols based on standards such as IEEE 802.11a, b, n, ac or IEEE 802.15 and the like. Generally, as the throughput of wireless APs increase, the effective ranges decrease. Moreover, the actual throughput of a wireless AP often significantly degrades proportional to the proximity of the network device to the wireless AP.

Further referring to FIG. 2, in an effort to enhance wireless AP coverage for devices such as mobile laptops 224 and the like, the network access devices 212-220 include wireless repeater circuitry that enhance the coverage of the dedicated AP 222 based on whether or not the network device has a wired network connection. Dotted-line ovals 226, 228, 230, 232, and 234 illustrate the enhanced range from network devices 212, 214, 216, 218, and 220 that each have wired network connections to the network switch 204.

Figure 3:
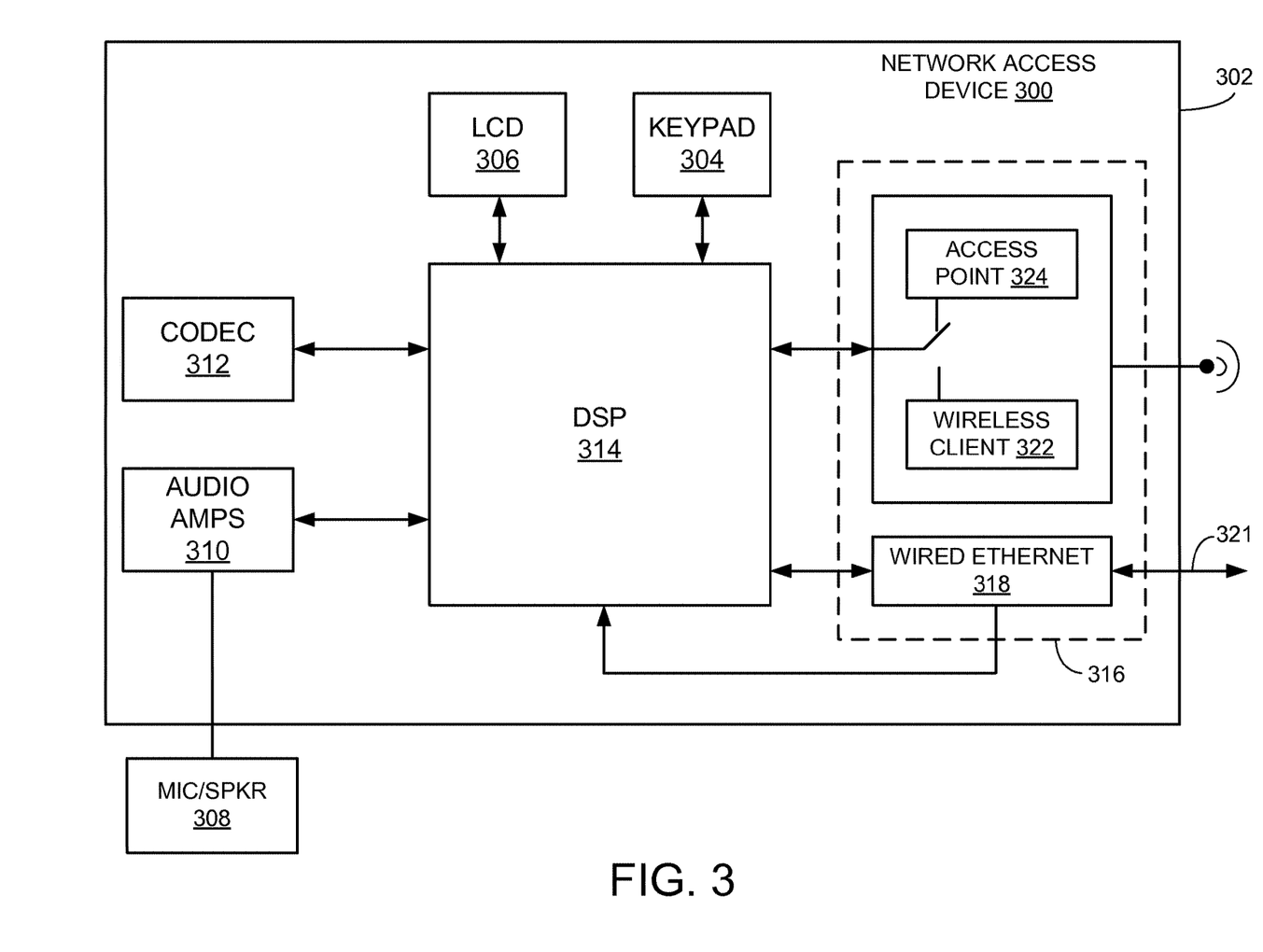
FIG. 3 illustrates one embodiment of a network device of FIG. 2 that is embodied as an Internet Protocol (IP) phone.

FIG. 3 illustrates one embodiment of a network access device, generally designated 300, for use in the network of FIG. 2. For one specific embodiment, the network access device 300 takes the form of an Internet Protocol (IP) telephone. Such telephones enable voice communication between remote locations via the Internet rather than the standard analog "Plain Old Telephone Service" (POTS) telephone network. Other types of network access devices may be utilized consistent with the teachings herein, such as network printers, computing devices, and the like.

Further referring to FIG. 3, the IP telephone 300 includes a housing 302 that mounts a keypad 304 and a display, such as an LCD 306. A microphone/speaker assembly 308 is provided to detect and generate voice waveforms and couples to corresponding audio amplifier circuits 310. A coder/decoder circuit 312 carries out coding and decoding operations, such as digital-to-analog (D/A) and analog-to-digital (A/D) conversion with respect to analog voice waveforms and the digital packets that are transferred via the digital network. Coupled to each of the circuits above is a digital-signal-processor (DSP) 314 to provide signal processing and overall control capabilities for the telephone.

With continued reference to FIG. 3, the IP telephone 300 includes a network interface 316 that employs both a wired network port 318 and a wireless network module 320. The wired network port 318 provides a first mode of network access for the IP telephone. The port 318 includes a jack to receive a wired connection, such as an Ethernet cable 321 coupled to the network switch (204, FIG. 2). In specific embodiments, the wired Ethernet connection may be compatible with high-speed Ethernet networks, such as 10GBASE-T, or other legacy high-speed Ethernet configurations.

The wireless network module 320 provides a second mode of network access for the IP telephone 300, and includes wireless client circuitry 322, such as a WiFi transceiver, that can establish a wireless connection to the dedicated wireless access point. The module provides additional wireless circuitry in the form of a wireless repeater 324 that is selectively activated via switch circuitry 326. The wireless repeater 324 may be configured to enhance wireless coverage for the dedicated access point, or alternatively to act as an access point in the event that the network doesn't employ a dedicated access point.

Figure 4:
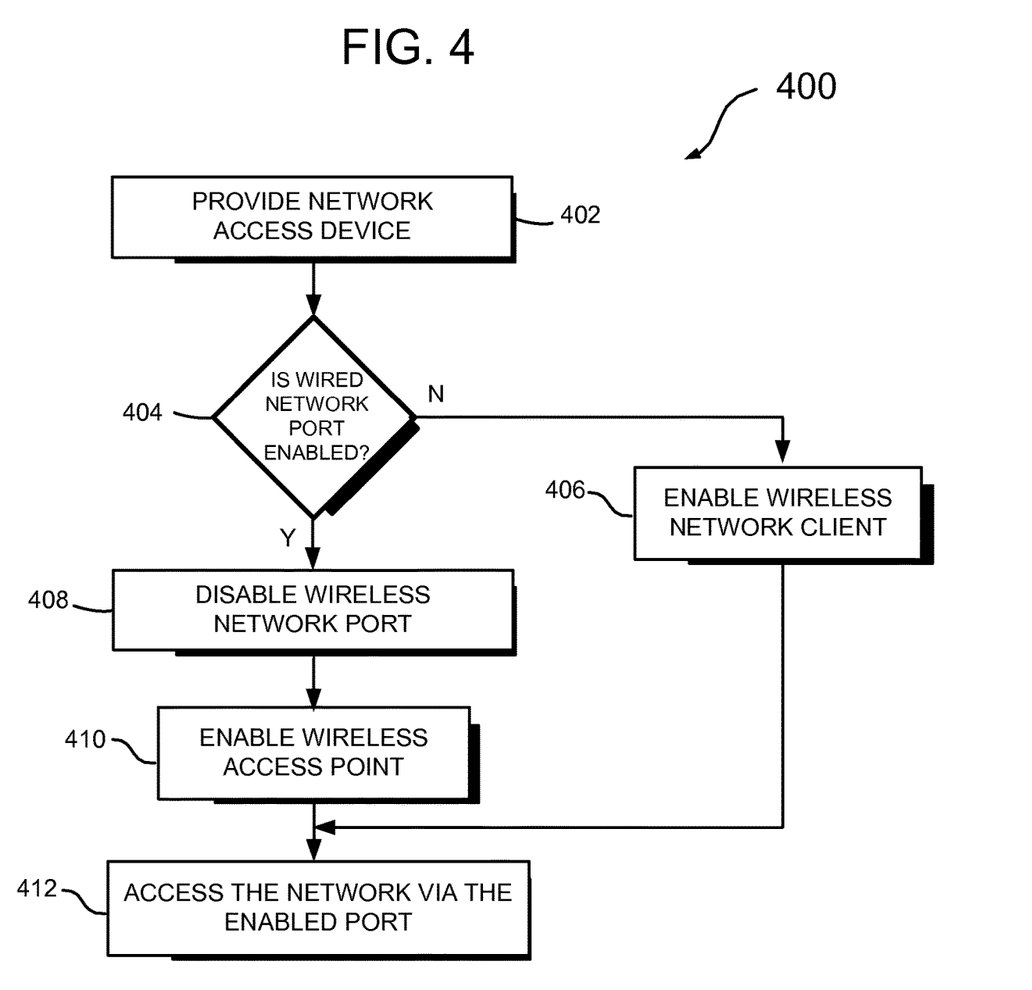
FIG. 4 illustrates a flowchart of steps carried out in one embodiment of a method of accessing a network.

For one specific embodiment, the configurability of the IP telephone 300 between modes generally depends on the availability of a wired network connection. FIG. 4 illustrates a flowchart of steps employed in a method of operation for a network access device such as that described with respect to FIG. 3. After providing a network access device, at 402, if an Ethernet cable is unavailable (preventing the wired network port from being enabled), at 404, the wireless client 322 may be enabled, at 406, to establish network connectivity for the IP telephone 300. In such a mode, the wired Ethernet port 318 and the wireless repeater circuitry 324 are disabled to maximize the performance of the wireless client circuitry 322. The IP telephone may then access the network via the enabled network port, at 412.

However, in the event that a wired Ethernet cable is plugged into the IP telephone, thus enabling the wired network port, at 404, a control signal that indicates a wired connection may be generated by the wired Ethernet circuitry 318 and fed to the DSP 314 to control the mode of operation. For the particular embodiment described, a wired network connection takes precedence over a wireless connection, and thus the wireless client circuitry 322 may be disabled, at 408. With the wireless client disabled, however, the wireless repeater 324 is free to be enabled, at 410, to enhance the range of the dedicated AP, or to act as an AP itself. The IP telephone may then access the network via the enabled wired network port, at 412.

Figure 5:
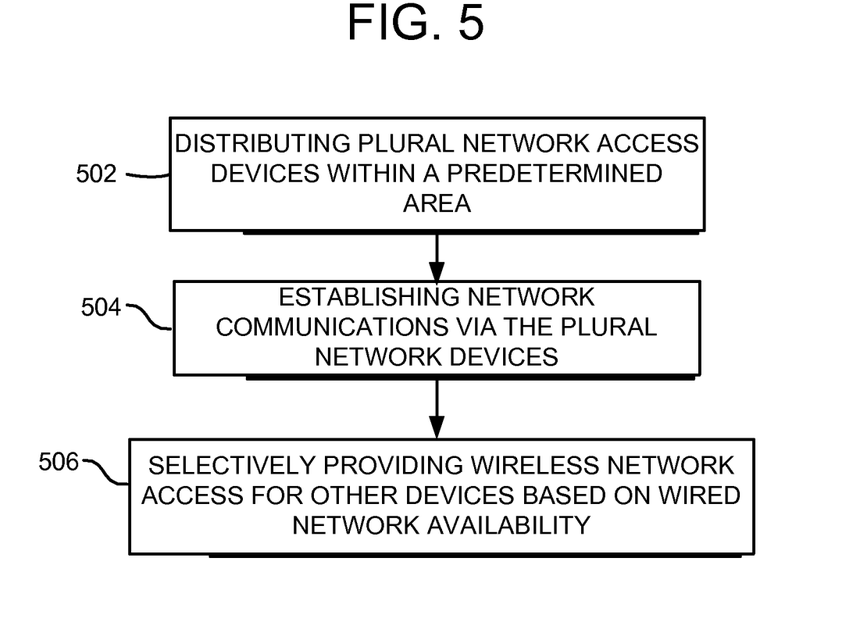
FIG. 5 illustrates a flowchart of steps carried out in one embodiment of a method for providing network access to multiple network devices.

FIG. 5 sets forth a flowchart of steps that may be employed for one embodiment of a method to provide area network access within a given area of interest. As noted earlier, with wireless access point technology providing higher throughput with each succeeding generation, a tradeoff in the throughput often results in the available range for the access point. Thus, a dedicated access point within a given location, such as a floor in an office building, may not be able to have sufficient range to avoid "dead zones" at various areas. The disclosed network access device, however, by including a configurable wired mode with wireless access point functionality, may supplement a dedicated access point by enhancing its range while providing a basic functionality as a wired IP phone.

Further referring to FIG. 5, plural network access devices, such as IP telephones consistent with the disclosure herein, may be distributed within the area of interest, at 502. Network communications via the plural network access devices may then be established, at 504. Depending on the availability of wired network ports, wireless network access may be selectively provided for devices other than the IP telephones via the enabled wireless Aps, at 506.

Those skilled in the art will appreciate that the various embodiments described herein improve semiconductor device yields by enabling salvaged multi-die semiconductor devices, such as scribe line duals, to be employed in packages even though less than all of the dies are operative. Moreover, the package configuration described enables a variety of device types to be used within a single package, thereby reducing costs by taking advantage of the economies of scale.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. An Ethernet network access device comprising:
   a device housing;
   a wired Ethernet network port coupled to the housing to access an Ethernet network, the wired Ethernet network port establishing a first user network connection for a first user when connected to a wired Ethernet line;
   a wireless Ethernet network module disposed in the housing, the wireless Ethernet network module including
      a wireless transceiver to access the network in the absence of a connection to the wired Ethernet line, and
      a wireless network repeater to provide wireless access to the network for a second network access device operated by a second user, the wireless repeater being operative to provide the second user access to the network via the first user network connection solely when the wired Ethernet network port is connected to the wired Ethernet line.

2. The Ethernet network access device according to claim 1, wherein:
   the Ethernet network access device comprises an Internet Protocol (IP) telephone.

3. The Ethernet network access device according to claim 1, wherein the wired Ethernet network port comprises a wired 10GBASE-T Ethernet port.

4. The Ethernet network access device according to claim 1, wherein the wireless network repeater extends a range of a wireless access point (AP) coupled to the network.

5. An area network comprising:
   plural Ethernet network access devices distributed throughout an area;
   each of the plural Ethernet network access devices having
      a device housing,
      a wired Ethernet network port coupled to the housing to access an Ethernet network, the wired Ethernet network port establishing a first user network connection for a first user when connected to a wired Ethernet line,
      a wireless transceiver disposed in the housing to access the network in the absence of a connection to the wired Ethernet line, and
      a wireless repeater in the housing to provide wireless network access for a different device operated by a second user, the wireless network repeater operative to provide the second user access to the network via the first user network connection solely when the wired Ethernet network port is connected to the wired Ethernet line.

6. The area network of claim 5, wherein the area network further comprises a dedicated wireless access point having a given range in the area, and at least one of the plural Ethernet network devices with a corresponding wireless repeater extends the range of the wireless access point.

7. The area network of claim 5, wherein the wired Ethernet network ports comprise 10GBASE-T Ethernet ports.

8. The area network of claim 5, wherein the wireless network transceivers comprise 802.11ac wireless transceivers.

9. The area network of claim 5, wherein at least a first group of the plural Ethernet network access devices comprise Internet Protocol (IP) telephones.

10. The area network of claim 5, wherein the plural Ethernet network devices are distributed throughout the area to, when the wireless repeaters are enabled as access points, provide wireless access to the network over substantially the entire area.

11. A method of accessing a network, the method comprising:
    providing an Ethernet network device having a housing, a wired Ethernet network port coupled to the housing, and a wireless module disposed in the housing, the wireless module having a wireless transceiver and a wireless network repeater;
    configuring the Ethernet network device to access the network by one of at least two modes, wherein
       for a first mode,
          establishing a first user network connection for a first user between the Ethernet network device when connected via the wired Ethernet network port, transferring data between the Ethernet network device and the network solely via the wired Ethernet network port, providing access to the network for a second network device operated by a second under via the first user network connection through the wireless network repeater solely when the wired Ethernet port is connected to a wired Ethernet line; and for a second mode, transferring data between the Ethernet network device and the network solely via the wireless transceiver, and disabling the wireless repeater.

12. The method according to claim 11, wherein the network device comprises an Internet Protocol (IP) telephone.

13. The method according to claim 11, wherein the configuring includes:

detecting whether or not the wired Ethernet network port has a wired connection to the network via the wired Ethernet line;

generating a command signal indicating whether or not the wired connection is detected; and selecting the first or second mode in response to the command signal.

* * * * *